3,063,987
18-DIMETHYLAMINO STEROIDS AND
INTERMEDIATES
Raphael Pappo, Skokie, Ill., assignor to G. D. Searle &
Co., Chicago, Ill., a corporation of Delaware
No Drawing. Filed June 16, 1959, Ser. No. 820,576
5 Claims. (Cl. 260—239.5)

The present invention relates to a new group of 18-dimethylamino steroids and to intermediates for their preparation. The nomenclature for the pentacyclic nitrogen compounds in the description given hereinbelow is that of Haworth and Michael, Journal Chem. Soc., 1957, 4973, who refer to the structure

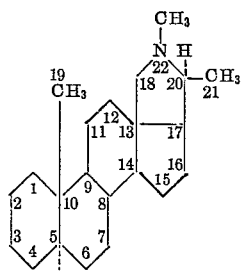

as conanine.

This invention provides compounds of the general structural formula

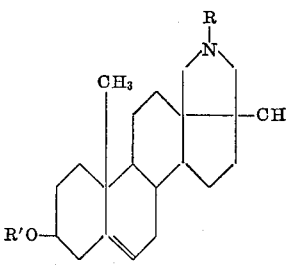

wherein R is hydrogen, methyl, or —C≡N and R' is hydrogen or the acyl radical of an aliphatic hydrocarbon carboxylic acid. Among the radicals which R' can represent are formyl, acetyl, propionyl, butyryl, and the like.

The compounds of this invention are conveniently prepared using conessine as the starting material. Conessine is reacted with aluminum chloride and sodium borohydride to prepare a boron complex which is then oxidized with chromium trioxide and acetic acid to yield 3-dimethylamino-6-oxoconanine. The 3-dimethylamino group is next quaternized selectively and the resulting quaternary salt is subjected to treatment with alcoholic alkali to yield 3,5-cyclo-6-oxoconanine of the structural formula

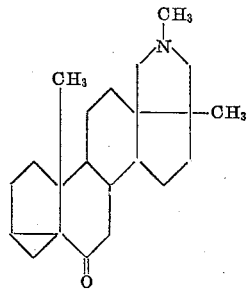

Reduction of 3,5-cyclo-6-oxoconanine with an alkali metal aluminum hydride, typically with lithium aluminum hydride, converts the 6-keto group to a 6-hydroxy group. This compound is conveniently isomerized and esterified with formic acid so as to yield 3-formyloxy-5-conenine of the structural formula

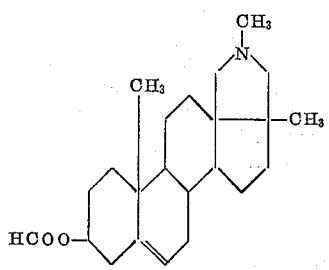

Oppenauer oxidation yields 3-oxo-4-conenine which is an active progestational agent. The quaternary salts have ganglion blocking activity.

3-hydroxy-5-conenine, after being quaternized and converted to the quaternary hydroxide or alkoxide, is heated, preferably in an aromatic hydrocarbon solvent of 6–8 carbon atoms, to yield 18-dimethylamino-5,20-pregnadien-3-ol. This compound can be converted by treatment with a peroxy acid or hydrogen peroxide to yield the N-oxide which, on treatment with a strong mineral acid in acetic acid, yields 3-acetoxy-18-dimethylamino-5-pregnen-20-one; this ester can then be hydrolyzed to the free 3-hydroxy compound. This compound and its acid addition salts such as the hydrochloride are topical anesthetics; its methohalides are ganglion blocking agents.

Esterification of 3-hydroxy-5-conenine is conducted in the conventional manner by heating with an acid anhydride. The esters of 3-hydroxy-5-conenine are valuable intermediates in the preparation of other active pharmacological compounds. Thus, treatment with cyanogen bromide preferably in an aromatic hydrocarbon solvent of 6–8 carbon atoms, yields 3-acyloxy-22-cyano-22-normethyl-5-conenine, which is converted to 3-hydroxy-22-normethyl-5-conenine by treatment with dilute acid in aqueous alkanol. Alkylation leads to the N-alkyl derivatives, the quaternary salts of which are ganglion blocking agents.

The foregoing tertiary bases of this invention form salts with inorganic and strong organic acids, including sulfuric, phosphoric, hydrobromic, hydroiodic, sulfamic, citric, lactic, maleic, nicotinic, malic, succinic, tartaric, cinnamic, acetic, benzoic, gluconic, ascorbic and related acids. They also form quaternary ammonium salts with a variety of organic esters of sulfuric, hydrohalic, and aromatic sulfonic acids. Among such esters are methyl chloride, bromide, and iodide; ethyl chloride, propyl chloride, butyl bromide, isobutyl chloride, benzyl chloride, phenethyl chloride, naphthylmethyl chloride, dimethyl sulfate, methylbenzenesulfonate, ethyl toluenesulfonate, ethylene chlorohydrin, propylene chlorohydrin, allyl chloride, methallyl bromide and crotyl bromide.

The present application is a continuation-in-part of my copending applications Serial No. 736,963, filed May 22, 1958, now Patent No. 2,913,455; Serial No. 758,920, filed September 4, 1958, now Patent No. 2,891,948; and Serial No. 775,099, filed November 20, 1958, now Patent No. 2,907,758.

The invention will be described in further detail in the following examples which are given for the purpose of illustration only and are not to be construed as limiting the invention in spirit or in scope. It will be obvious

3 to those skilled in the art that numerous modifications both in materials and methods may be practiced without departing from this invention. In these examples quantities are indicated as parts by weight and temperatures in degrees centigrade (° C.).

Example 1

To a stirred solution of 60 parts of sodium borohydride and 65 parts of aluminum chloride in 1000 parts of anhydrous β,β'-dimethoxydiethyl ether are added 80 parts of finely divided conessine. The walls of the vessel are washed with 100 parts of β,β'-dimethoxydiethyl ether and the mixture is stirred and heated under nitrogen at 60–70° C. for 10 hours. The mixture is then cooled in ice and treated cautiously with an excess of chilled hydrochloric acid. A large amount of hydrogen is evolved with simultaneous appearance of a grayish-white precipitate of sodium chloride. After standing for 12 hours at room temperature the mixture is filtered and the sodium chloride is washed with benzene. The combined filtrate and washings are treated with excess aqueous sodium hydroxide and the organic layer is separated by decantation. The aqueous layer is extracted with benzene and the combined organic solutions are dried over anhydrous sodium sulfate and concentrated under reduced pressure to a viscous gum. The boron compound thus obtained is dissolved in 800 parts of acetic acid and, while agitated, is treated in the course of 7 hours by the gradual addition of a solution of 200 parts of chromic anhydride in 200 parts of water while the temperature is maintained at 17–25° C. Agitation at room temperature is continued for 12 hours after which the mixture is stirred for 5 hours with 40 parts of 2-propanol and then concentrated under reduced pressure to a viscous residue which is diluted with water, cooled, stirred and treated by slow addition with an excess of a 40% aqueous sodium hydroxide solution. The deep green mixture is extracted repeatedly with a mixture of ether in benzene. The combined organic solutions are carefully washed with water, dried over anhydrous sodium sulfate and concentrated under reduced pressure to dryness. The residue is dissolved in a minimum amount of benzene, filtered to remove some insoluble material and the filtrate is taken to dryness to yield crystalline 3-dimethylamino-6-oxoconanine. The compound is sufficiently pure for the preparations described hereinbelow. Further purification can be achieved by filtering a benzene solution of this compound through 400 parts of an adsorbent containing 15% magnesium dioxide and 85% silicon dioxide and washing the adsorbent with a 1:1 mixture of ether in benzene. On concentration of the eluate and recrystallization of the residue from benzene and petroleum ether the compound melts at about 198–203° C. The rotation of a 0.45% chloroform solution $\alpha_D$ is +11.1°. Infrared maxima are observed at 3.40, 3.50, 3.62, 5.88, 6.90, 7.24, 8.51, and 9.62 microns.

Example 2

A solution of 29.4 parts of 3-dimethylamino-6-oxoconanine in 1000 parts of ether is treated with 15 parts of methyl p-toluenesulfonate. The homogeneous solution slowly deposits a crystalline white solid. After standing for about 11 days at room temperature the mixture is filtered and the crystalline solid is washed with ether and dried to yield the methotoluenesulfonate of 3-dimethylamino-6-oxoconanine. Unreacted tertiary amine can be recovered from the mother liquors by extraction with dilute aqueous hydrochloric acid.

Example 3

A solution of 1.5 parts of 3-dimethylamino-6-oxoconanine in 35 parts of ether is treated with 0.64 part of iodomethane. The methiodide is permitted to crystallize out and is then collected on a filter, washed with ether and dried to yield the methiodide of 3-dimethylamino-6-oxoconanine melting at about 230–240° C.

Example 4

A solution of 4.04 parts of the 3-methotoluene-sulfonate of 3-dimethylamino-6-oxoconanine in 6 parts of methanol is treated with a solution of 1.5 parts of potassium hydroxide in 9 parts of methanol. A bulky crystalline precipitate forms within a few minutes. The mixture is then refluxed for 5.5 hours under nitrogen and concentrated almost to dryness under a stream of nitrogen on the steam bath. The residue is taken up in water and extracted twice with a mixture of ether and benzene. The extract is washed with water, dried over anhydrous sodium sulfate and concentrated to dryness under nitrogen to yield 3,5-cyclo-6-oxoconanine of the structural formula

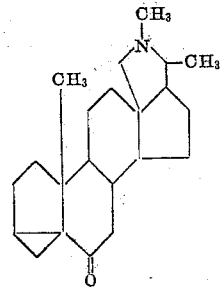

The compound melts at about 118–120° C. Infrared maxima are observed at 3.38, 3.41, 3.48, 3.6, 5.05, 6.90, 7.24, 7.65, 8.48 and 8.56 microns. A methanolic solution shows an ultraviolet maximum at 205 millicrons with a molecular extinction coefficient of about 5150. The rotation of a 1% chloroform solution $\alpha_D$ is +79.94°.

Example 5

A solution of 0.5 part of 3,5-cyclo-6-oxoconanine in 12 parts of tetrahydrofuran is treated with 0.5 part of lithium aluminum hydride in 10 parts of tetrahydrofuran. The mixture is refluxed for 30 minutes and then stirred at room temperature for 150 minutes under nitrogen. The solution is then treated successively with 0.53 part of water and 0.4 part of a 20% aqueous sodium hydroxide solution, 1.85 parts of water and diluted with ether. The mixture is filtered and the precipitate is washed with ether. The combined filtrates are taken to dryness under nitrogen on the steam bath and the crystalline residue is triturated with water, filtered, washed with water, and dried to yield white crystals. Recrystallization from benzene yields 3,5-cyclo-6α-hydroxyconanine melting at about 181–184° C. The 6β-isomer can be obtained from the mother liquors.

Example 6

5.2 parts of the crude mixture of epimeric 6-hydroxy compounds obtained by lithium aluminum hydride reduction in the preceding example are dissolved in 127 parts of 98–100% formic acid and allowed to stand at room temperature for 48 hours. The mixture is then concentrated under reduced pressure at room temperature and the residue is refluxed for 4 hours with excess methanolic potassium hydroxide. The homogeneous solution is then concentrated under reduced pressure and the residue is diluted with water. The crystalline precipitate is collected on a filter, washed with water and dried. On recrystallization from benzene there are obtained colorless crystals melting at about 126–128° C. The infrared absorption spectrum of the 3-hydroxy-5-conenine thus obtained shows maxima at 3.12, 3.41, 3.6, 6.0, 7.9, 7.25, 8.52, and 9.50 microns. The rotation $\alpha_D$ is −6.43° as determined in a 1% chloroform solution. The compound has the structural formula

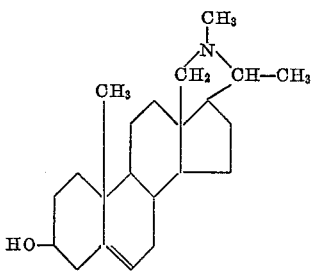

Example 7

The mixture of epimeric 3,5-cyclo-6-hydroxyconanines is treated as in the preceding experiment with formic acid. After removing the solvent under reduced pressure, the residue is taken up in water and ether and the mixture is treated with cold aqueous sodium hydroxide. The resulting precipitate is immediately taken up in ether and the organic layer is washed with water, dried over anhydrous magnesium sulfate, filtered and taken to dryness. The residue is crystallized on trituration with petroleum ether. There is thus obtained 3-formyloxy-5-conenine melting at 123–125° C.

Example 8

A mixture of one part of 3-hydroxy-5-conenine is heated with 2 parts of acetic anhydride and 2 parts of pyridine for 40 minutes at 60° C. and then poured into ice water. The crystals are collected on a filter and recrystallized from a mixture of benzene and petroleum ether to yield 3-acetoxy-5-conenine in thick prisms melting at about 155–158° C. The rotation $\alpha_D$ in 1% chloroform solution is −12.63°. Infrared maxima are observed at 3.4, 3.5, 3.6, 5.78, 5.98, 6.93, 7.23, 8.1, 9.65, 10.11, 11.1, and 12.55 microns.

Example 9

To a solution of 3.86 parts of 3-hydroxy-5-conenine in 12 parts of methanol are added 22.4 parts of iodomethane. The mixture is permitted to stand at room temperature for about 4 days and then concentrated under vacuum. The residue is triturated with 30 parts of acetone, filtered and washed with acetone and dried to yield the methiodide of 3-hydroxy-5-conenine melting at about 237–243° C.

Example 10

A suspension of 5.3 parts of finely divided 3-hydroxy-5-conenine methiodide in 45 parts of water and 5 parts of methanol is stirred at room temperature for 1 hour with 5 parts of silver oxide and then filtered. The filtrate is concentrated to a small volume at room temperature under reduced pressure and the residue is suspended in toluene. The suspension is stirred and distilled slowly over a one-hour period and then cooled and taken up in ether and water. The organic layer is separated, washed with water, dried and concentrated under nitrogen on the steam bath to yield 18-dimethylamino-5,20-pregnadien-3-ol melting at about 138–140° C. Infrared maxima are observed at 3.1, 3.41, 3.62, 6.00, 6.13, 6.85, 9.43, and 11.1 microns.

Example 11

A solution of 0.5 part of 18-dimethylamino-5,20-pregnadien-3-ol in 14 parts of ether is treated with 9 parts of an 0.165 molar solution of perbenzoic acid in benzene at room temperature. The mixture is advantageously seeded with the amine-oxide benzoate whereupon crystals start to form immediately. Otherwise crystallization has to be awaited on standing. The crystalline crop is collected on a filter and the crystals are washed with ether and dried. The benzoic acid salt of 3-hydroxy-18-dimethylamino-5,20-pregnadiene N-oxide is then triturated with a hot 10% aqueous sodium hydroxide solution. The resulting solid is collected on a filter, washed with sodium hydroxide, water, dried and washed again with ether to remove traces of unreacted starting material to yield 18-dimethylamino-5,20-pregnadien-3-ol N-oxide melting at about 202–204° C. The infrared absorption spectrum shows a broad absorption between 3 and 4 microns and maxima at 5.5, 6.00, 6.14, 6.82, 6.95, 7.45, 9.37, 10.71 and 11.01 microns.

A solution of 7.5 parts of 18-dimethylamino-5,20-pregnadien-3-ol N-oxide in 15 parts of acetic acid and 18 parts of 36% hydrochloric acid is maintained at room temperature for 4 hours after which the solution is rendered alkaline by addition of cold aqueous sodium hydroxide and exhaustively extracted with ether. The ether extract is washed with water, dried and taken to dryness. The resulting oil is treated with 5 times its weight of acetic anhydride and 10 times its weight of pyridine and heated at 60° C. for 45 minutes. The mixture is then poured in water and the 3-acetoxy-18-dimethylamino-5-pregnen-20-one is thus obtained as a light brown oil. The infrared absorption spectrum shows maxima at 3.4, 3.6, 5.80, 5.92, 6.83, 7.25, 7.37, 7.98, and 9.70 microns.

The aqueous layer, remaining after the ether extraction, is heated on the steam bath for 30 minutes whereupon a white precipitate forms. Extraction of the reaction mixture with a mixture of ether in benzene yields in partially crystalline form 3-hydroxy-18-dimethylamino-5-pregnen-20-one.

Example 12

A solution of 0.194 part of 3-hydroxy-5-conenine in 45 parts of toluene and 3.6 parts of cyclohexanone is heated to reflux under nitrogen after which 15 parts of solvent are removed by distillation. Then 0.25 part of aluminum isopropoxide are added and the mixture is stirred at reflux for 35 minutes. The solution is cooled and acidified with excess aqueous sulfuric acid. The aqueous phase is separated, washed with ether, and rendered alkaline by addition of aqueous sodium hydroxide. The resulting precipitate is immediately extracted with ether and the ether extract is washed with water, dried and concentrated in vacuum under nitrogen. Upon recrystallization from ether, the 3-oxo-4-conenine thus obtained melts at about 112–113° C. The ultraviolet absorption spectrum in a methanolic solution shows a maximum at 241 millimicrons with a molecular extinction coefficient of about 17,000. The infrared absorption spectrum shows no band characteristic of a hydroxy group but a very strong band of 6 microns.

Example 13

A solution of 1 part of 3-acetoxy-5-conenine in 17.5 parts of benzene and 3 parts of cyanogen bromide is maintained at 70° C. for 15 hours. The solvent is then removed under reduced pressure. The residue is taken up in an equimolar mixture of ether and benzene, washed with dilute aqueous hydrochloric acid, and then with water, dried over sodium sulfate and concentrated to dryness under vacuum to yield 3β-acetoxy-22-cyano-22-nor-5-conenine of the structural formula

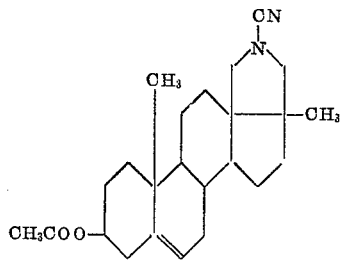

The compound shows absorption maxima in the infrared spectrum at 3.42, 3.51 (very strong), 4.53 (strong), 5.75 (very strong), 8.05 (very strong), and 9.70 (very strong).

Example 14

A solution of 0.5 part of the nitrile obtained in the preceding example, 0.28 part of ethylene glycol and 0.5 part of potassium hydroxide is refluxed under nitrogen for 15 hours. The solution is concentrated to a small volume and then diluted with water. The precipitate is collected by filtration and dried to yield 3β-hydroxy-22-nor-5-conenine of the structural formula

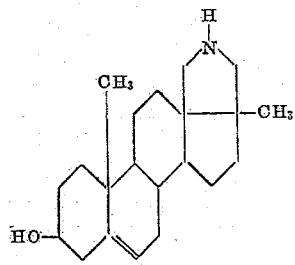

The compound shows absorption maxima in the infrared spectrum at 2.80 to 3.00 (broad), 3.42, 3.51, and 9.60 (very strong) microns.

Alternatively, 0.3 part of the nitrile is dissolved in 8 parts of 2-propanol and 6 parts of concentrated hydrochloric acid and refluxed under nitrogen for 15 hours. The solution is concentrated to a small volume under reduced pressure, diluted with water and treated with an excess of sodium hydroxide solution. The resulting precipitate is collected by filtration.

What is claimed is:

1. A compound of the structural formula

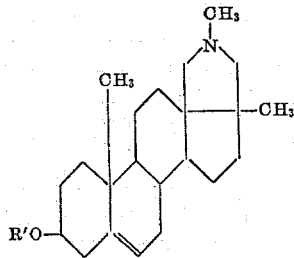

wherein R' is a member of the class consisting of hydrogen and acyl radicals derived from aliphatic hydrocarbon carboxylic acids containing fewer than 3 carbon atoms.

2. A compound of the structural formula

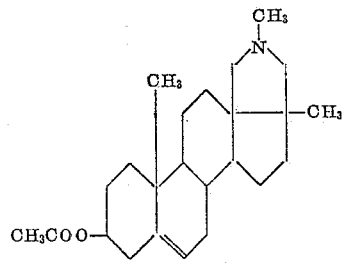

3. A compound of the structural formula

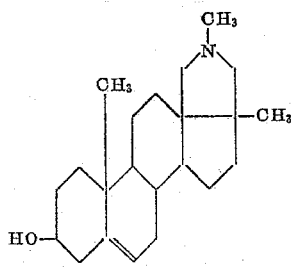

4. A compound of the structural formula

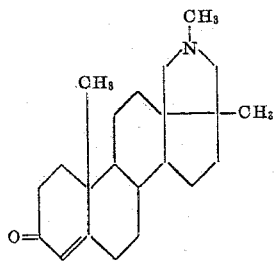

5. 3β-hydroxy-18-dimethylamino-5-pregnen-20-one.

References Cited in the file of this patent

Buzzetti et al.: Helv. Chim. Acta, vol. 42, pages 388–90, February 2, 1959.

Cerny et al.: Chem. and Industry, vol. 16, pages 516–17, April 18, 1959.

UNITED STATES PATENT OFFICE
CERTIFICATE OF CORRECTION

Patent No. 3,063,987            November 13, 1962

Raphael Pappo

It is hereby certified that error appears in the above numbered patent requiring correction and that the said Letters Patent should read as corrected below.

Column 1, lines 30 to 40, the right-hand portion of the formula should appear as shown below instead of as in the patent:

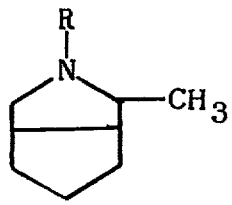

lines 47 and 48, for "horohydride" read -- borohydride --; same column 1, lines 55 to 65, and column 2, lines 5 to 15, the right-hand portion of the formulae should appear as shown below instead of as in the patent:

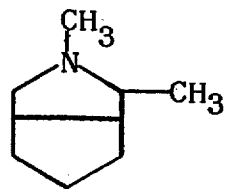

column 4, lines 11 and 12, for "nitrogon" read -- nitrogen --; column 6, lines 62 to 72, the right-hand portion of the formula should appear as shown below instead of as in the patent:

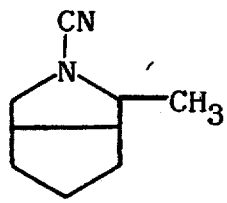

column 7, lines 10 to 20, the right-hand portion of the formula should appear as shown below instead of as in the patent:

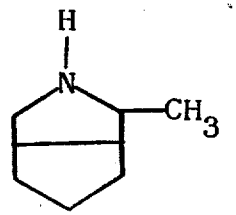

same column 7, lines 33 to 43, and column 8, lines 3 to 13, lines 15 to 25 and lines 28 to 38, the right-hand portion of the formulae should appear as shown below instead of as in the patent:

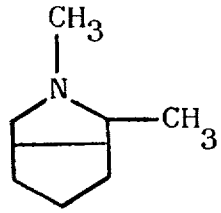

Signed and sealed this 14th day of January 1964.

(SEAL)
Attest:

ERNEST W. SWIDER

Attesting Officer

EDWIN L. REYNOLDS
Acting Commissioner
of Patents